US012685301B2

(12) United States Patent
Guerequiz Larrocea et al.

(10) Patent No.: US 12,685,301 B2
(45) Date of Patent: Jul. 21, 2026

(54) SMART INSECT TRAP

(71) Applicant: FERIMARK 2016 S.L., La Candelaria (ES)

(72) Inventors: Iratxe Guerequiz Larrocea, La Candelaria (ES); Fernando Rodrigo Pinacho Crisostomo, La Candelaria (ES)

(73) Assignee: FERIMARK 2016 S.L. (ES)

( * ) Notice: Subject to any disclaimer, the term of this patent is extended or adjusted under 35 U.S.C. 154(b) by 16 days.

(21) Appl. No.: 18/859,186

(22) PCT Filed: Apr. 24, 2023

(86) PCT No.: PCT/ES2023/070255
§ 371 (c)(1),
(2) Date: Oct. 23, 2024

(87) PCT Pub. No.: WO2023/209255
PCT Pub. Date: Nov. 2, 2023

(65) Prior Publication Data
US 2025/0324962 A1     Oct. 23, 2025

(30) Foreign Application Priority Data
Apr. 25, 2022   (ES) ............................. ES202230685U

(51) Int. Cl.
*A01M 1/02* (2006.01)
*A01M 1/12* (2006.01)
*A01M 1/14* (2006.01)

(52) U.S. Cl.
CPC .............. *A01M 1/026* (2013.01); *A01M 1/12* (2013.01); *A01M 1/14* (2013.01)

(58) Field of Classification Search
CPC ........... A01M 1/12; A01M 1/14; A01M 1/145
See application file for complete search history.

(56) References Cited

U.S. PATENT DOCUMENTS 5,325,625 A      7/1994  Liu et al.
7,748,159 B1 *   7/2010  Wenner ................... A01M 1/24
                                                            43/115
11,684,057 B2 *  6/2023  Ali ........................ A01M 1/106
                                                            43/111

(Continued)

FOREIGN PATENT DOCUMENTS

CN       110742047 A  *  2/2020  ............... G06T 7/13
IT   201800001753 A1 *  7/2019  ........... A01M 1/145

(Continued)

*Primary Examiner* — Magdalena Topolski

(57) ABSTRACT

An intelligent insect trap is disclosed, which allows a simple and effective monitoring of the insects captured inside the trap. It consists of a cylindrical or prismatic housing with a perimetral entrance accessing to an usable internal surface positioned in the active state/mode. This surface is adhesive and located near a container that holds a semiochemical lure. The trap also includes one or more video or photo cameras oriented towards the active sticky surface. Additionally, the trap comprises two or more adherent surfaces, which are mobile along the housing, preferably in the form of a disc or ring, and configured to be consecutively positioned in the active state.

5 Claims, 5 Drawing Sheets

(56)           References Cited

U.S. PATENT DOCUMENTS

| | | | | |
|---|---|---|---|---|
| 2005/0172542 A1* | 8/2005 | Rose | ..................... | A01M 1/145 |
| | | | | 43/113 |
| 2007/0068066 A1* | 3/2007 | Reatti | ..................... | A01M 1/14 |
| | | | | 43/114 |
| 2014/0007488 A1* | 1/2014 | Calabrese | ............... | A01M 1/16 |
| | | | | 43/115 |

FOREIGN PATENT DOCUMENTS

| | | | | | |
|---|---|---|---|---|---|
| KR | 20080100722 A | * | 11/2008 | ............ | A01M 1/103 |
| KR | 20090032253 A | * | 4/2009 | .............. | A01M 1/14 |
| KR | 20230173327 A | * | 12/2023 | .............. | A01M 1/12 |

* cited by examiner

SMART INSECT TRAP

TECHNICAL FIELD

The present invention relates to an intelligent insect trap, as for example to species from the Lepidoptera order, although not limited to this order, for remote monitoring and pest control. It allows a simple and effective monitoring and/or studying the insects captured inside the trap present in crops, forests, gardens, or other agricultural systems.

PRIOR ART

The state of the art includes the trap disclosed in ES1195312U. It is a trap for remote monitoring of agricultural and forest pests, using semiochemicals (pheromones, allelochemicals, etc.) to attract insects. It has an insect entry point, adhesive bases to retain insects, and one or more cameras that transmit the trap's contents to a remote station. Additionally, it has a series of humidity and temperature sensors. This trap is considered the closest state of the art to the invention.

The applicant is not aware of any solution to these problems that is as effective and efficient as the one claimed.

BRIEF STATEMENT OF THE INVENTION

The invention consists of an intelligent insect trap as described in the claims.

The invention presents a design improvement that allows savings in materials (the type of material used in manufacturing, electronic devices, such as cameras for image capture), as well as in size. These modifications also simplify the assembly of the new system and its logistics. Additionally, it allows a single trap to operate autonomously for a longer time.

To achieve this, the insect trap features a cylindrical or prismatic housing with a perimetral entrance leading to an usable internal surface positioned in the active state/mode. This active surface, accessible from the entrance, is adhesive (sticky) and is close to the container holding the semiochemical. The trap also includes one or more video or photo cameras oriented toward the active surface, as well as a power battery. According to the invention, the trap includes two or more surfaces that are mobile along the housing, preferably disc or ring-shaped, and are configured to be consecutively positioned in an active state/mode.

Preferably, the trap housing includes a support that holds one or more adjustable photovoltaic plates for battery recharging.

It may also include a communication system with a server: GSM, LoRa, Wi-Fi, etc., depending on the location of a nearby repeater or receiver, the necessary range, etc.

Other specific solutions are included in the dependent claims and are described in detail below.

BRIEF DESCRIPTION OF DRAWINGS

To complement this description and to aid in a better understanding of the unique invention's features, a set of drawings is provided as an illustrative and non-limiting example, representing the following.

BEST MODE FOR CARRYING OUT THE INVENTION

Below, an example of an implementation of the invention is described briefly, as an illustrative and non-limiting example of it.

Figure 1:
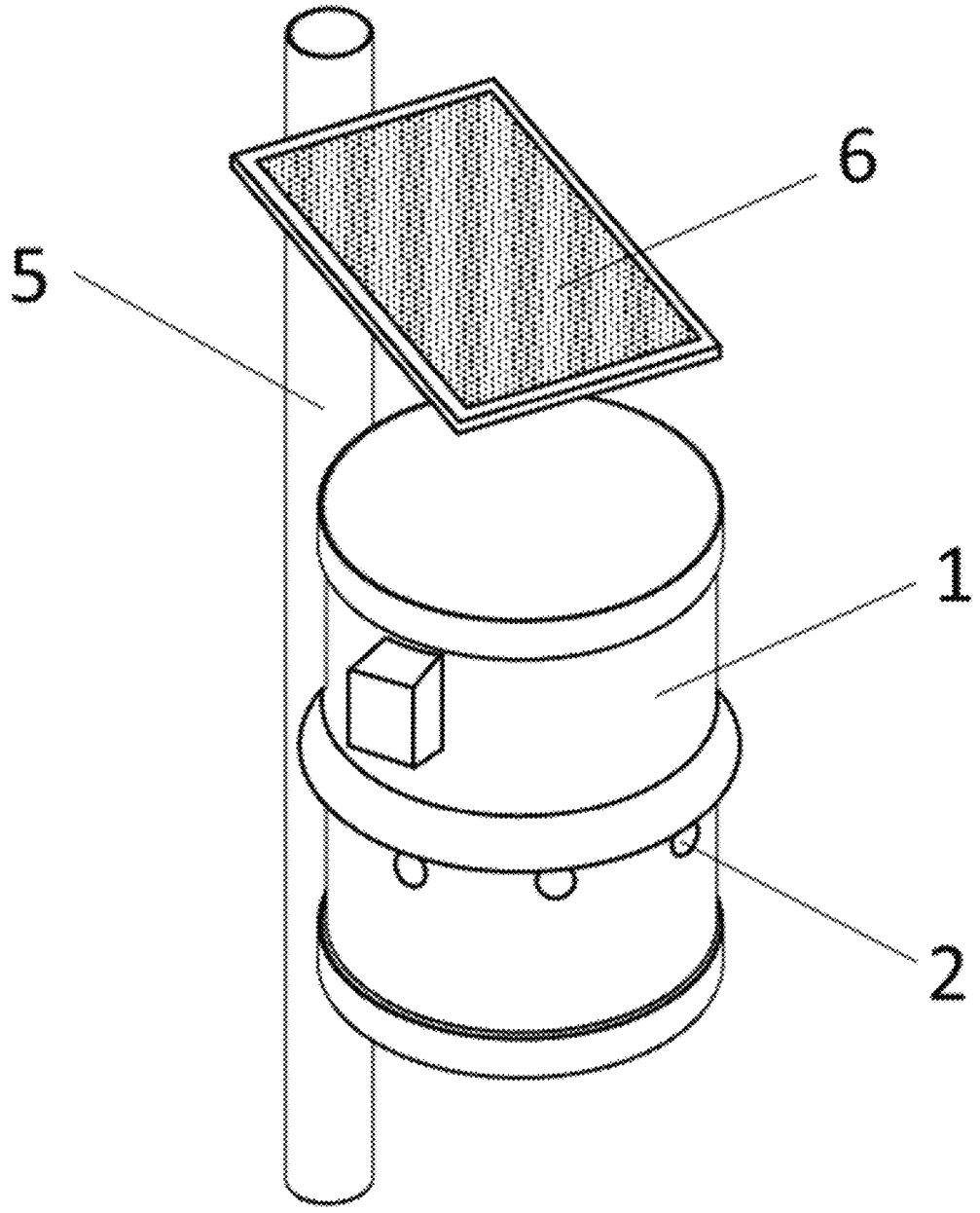
FIG. 1: Schematic view of an example of the invention.

FIG. 1 shows a general view of the trap according to an implementation. It includes a cylindrical housing (1) with a perimeter entrance (2) formed by a removable grid. Inside the housing (1), a container (7) holds the semiochemical specific to the insect to be attracted, along with a series of bases (3) in the form of discs or rings, with adhesive on their usable surfaces. One of the surfaces (3), referred to as "active," exposes its adhesive/sticky surface to the entrance (2), while the rest are hidden by it or other surfaces (3). The unused and "inactive" surfaces are stored at the top of the housing (1) and can be moved to the active position when the user remotely activates the change system with the servomotor (12).

One or more cameras (4) are oriented toward the active surface. The camera (4), typically one, can store images until they are manually retrieved or sent by an appropriate method to a computer server. For instance, through a SIM card, a LoRa communication system, Wi-Fi, etc., with the appropriate and required range.

Figure 2:
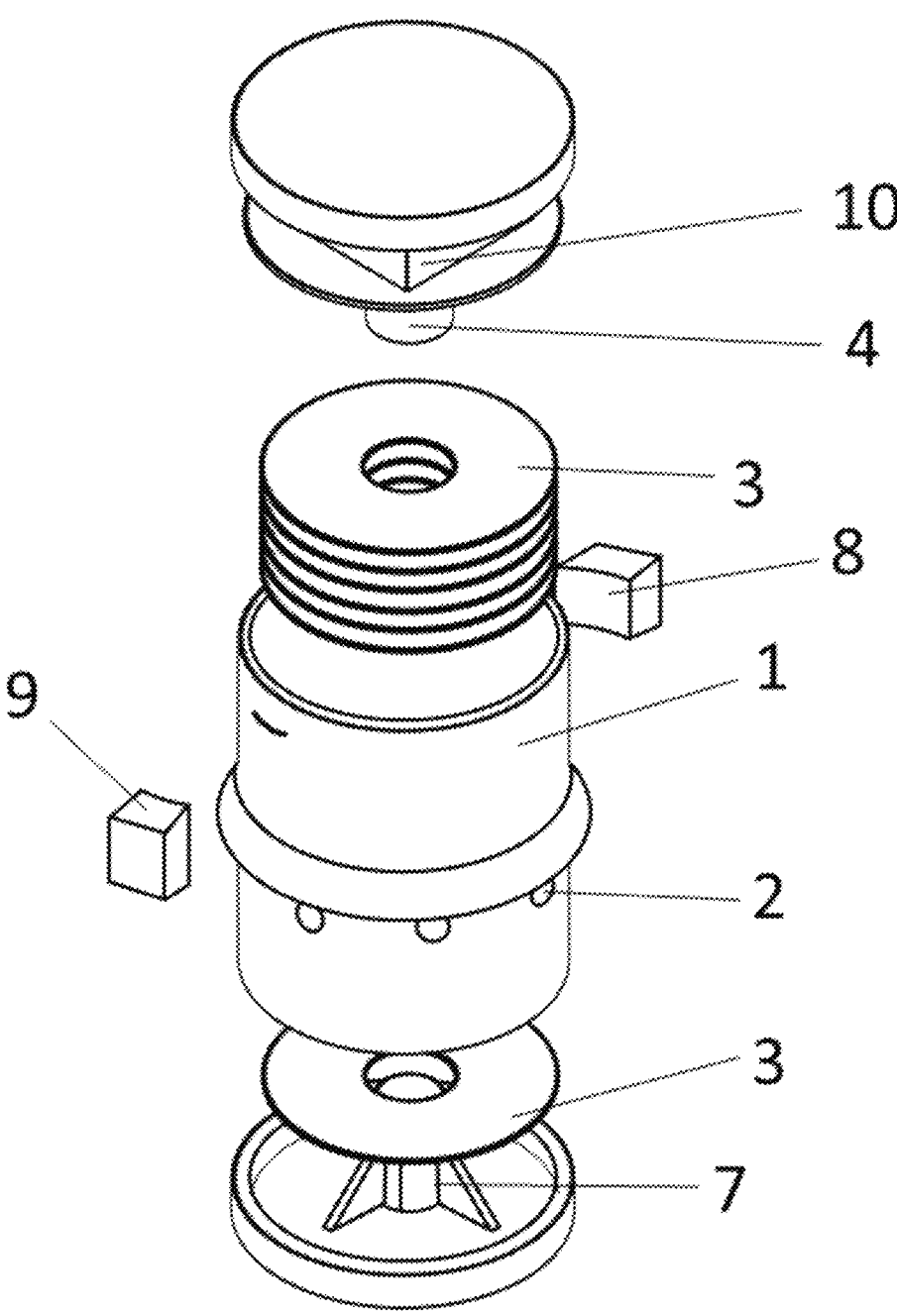
FIG. 2: Exploded view drawing of the main parts of the previous example.

For example, the surfaces (3) can have a central hole, so the camera (4) aligns with that central hole (FIG. 2). Thus, the two elements do not interfere with each other.

Figure 3:
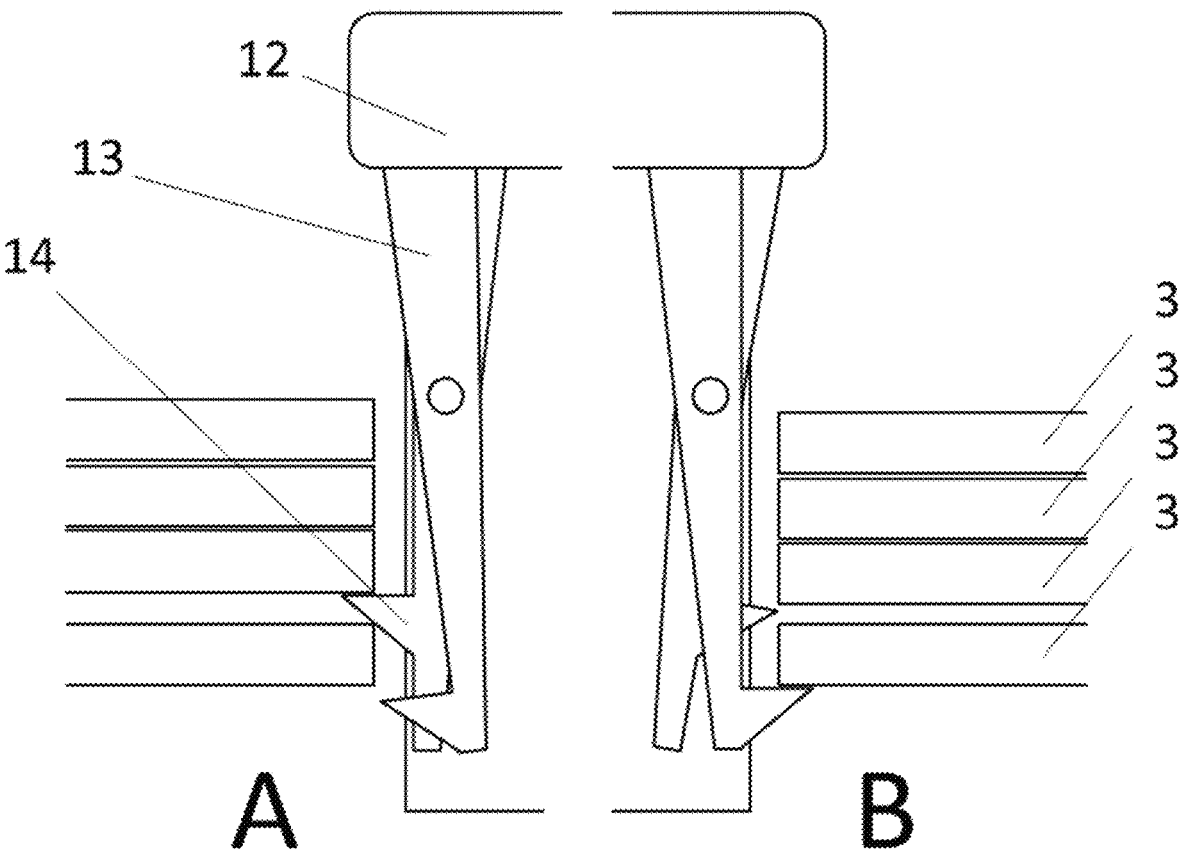
FIG. 3: Example of the base-changing system using a servomotor.

In use, insects are attracted inside by the specific semiochemical within a container (7), and they adhered/trapped on the active sticky surface (3). Once the active sticky surface (3) is considered saturated with insects or a reset is desired, the servomotor (12) moves an inactive surface (3) stored at the top of the housing (1) to replace the used active surface (3). This process moves a new surface (3) into the active position, covering the previously used one. For example, the surfaces (3) descend by gravity into the active position, using the mechanism illustrated in FIG. 3. In this figure, two claws (13, 14) perform alternating movements to sequentially release the bases (3). The two claws (13, 14) have spikes that hold the bases (3). The upper claw (14) separates the lowest surface from the rest, while the lower claw (13) releases the bottom base to activate it (FIG. 3A). In FIG. 3B, all surfaces are retained.

Figure 4:
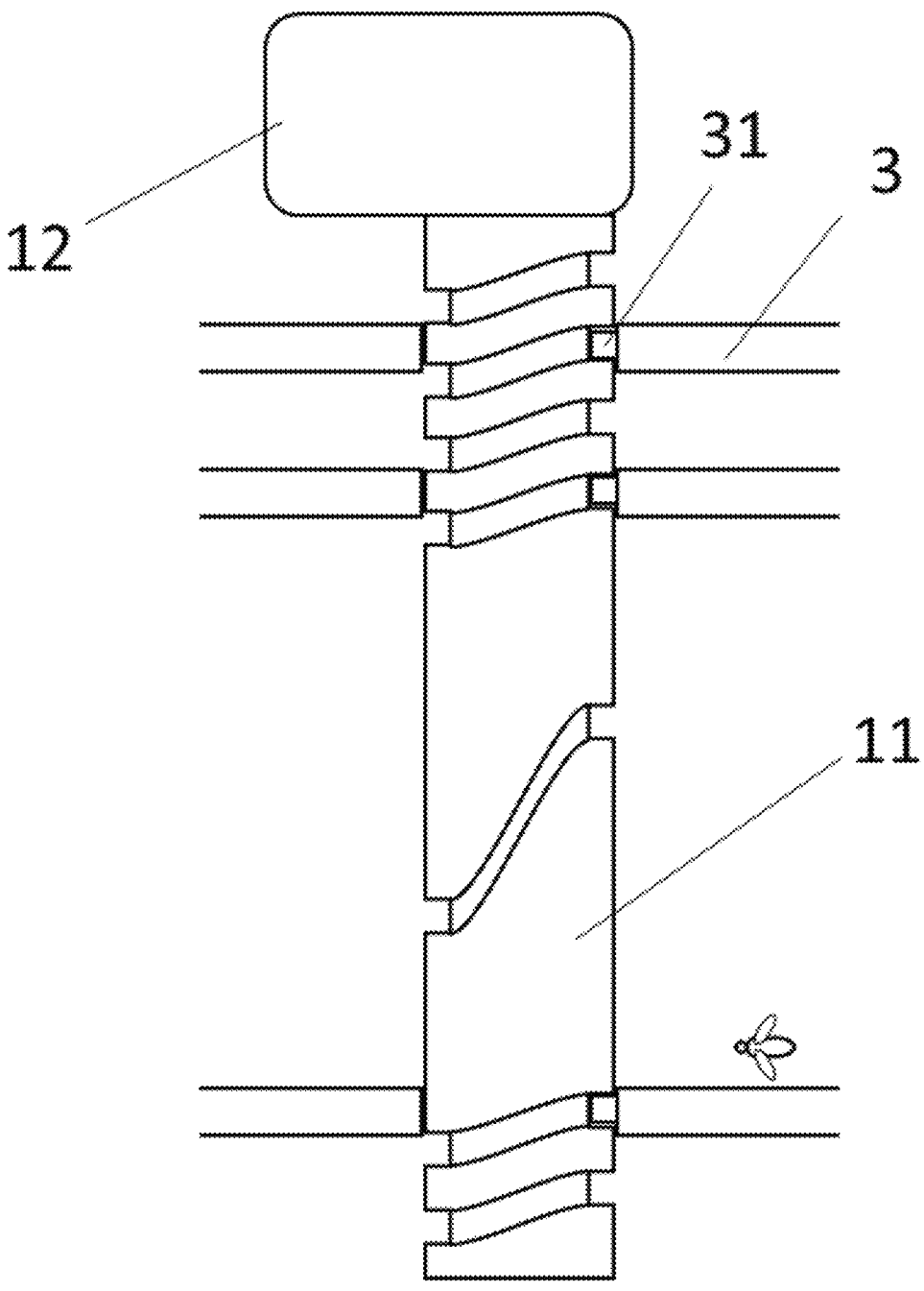
FIG. 4: Example of the method for moving the bases consecutively. (A) dropping the lowest base while retaining the others; (B) retaining all bases.

Another embodiment, shown schematically in FIG. 4, involves the surfaces (3) being interlocked by an alignment pin (31), for instance, in the slot of a variably pitched worm screw (11), which allows the surface (3) moves down at different speed. At one end, for storage, the pitch distance is narrow, so the surfaces (3) are close to each other (top in FIG. 4). At the active surface (3) area, the pitch distance is wider, allowing the base to move faster into the working position while the previous surfaces barely move. When a surface change (3) is desired, the worm screw continues turning, advancing the new surface (3) through the large pitch area, while the used surface moves down through a small pitch area, covered by the new or falls by gravity into a container. In another embodiment, the active surface (3) area lacks the screw, allowing it to fall by its weight. Consequently, a gap opens for insect access to the usable surface.

Figure 5:
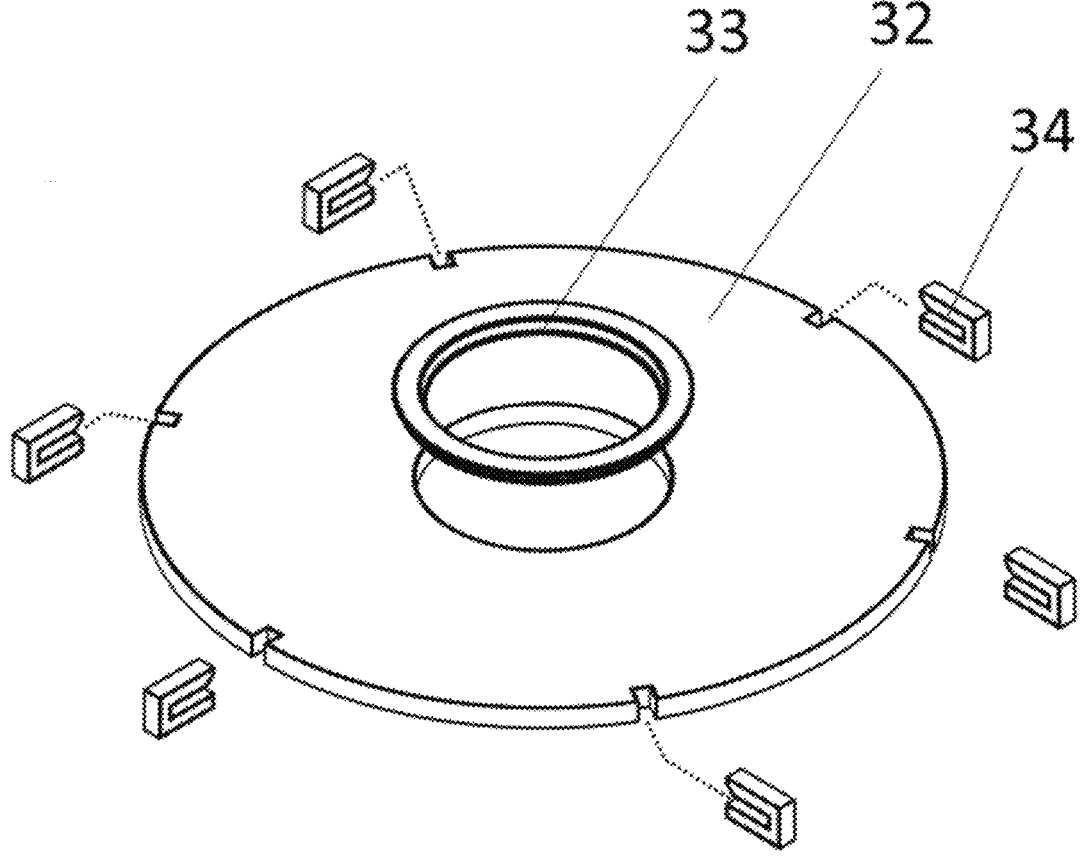
FIG. 5: Circular base containing adhesive/sticky surface for insect capture.

FIG. 5 shows an exploded drawing of a surface (3). It includes an adhesive ring-shaped sheet (32), an inner reinforcing ring (33), and several peripheral clamps (34). The clamps (34), among other functions, separate the surfaces (3) from each other.

The trap housing (1) can be attached to a pole by mounting clamps (5). On top of the trap housing one or more photovoltaic plates (6) can be set for recharging the battery that powers the entire trap. This allows the photovoltaic plates (6) to be oriented independently of the trap (1) position or orientation. A power on/off button cage (8) manages the trap by powering the electronic controller (10), which manages and control all the electronic devices (servomotor, sensors, camera, etc.) of the trap.

Additionally, it includes humidity and/or temperature sensors (9), as known from the cited state of the art, but not limited exclusively to sensors for these two parameters.

What is claimed is:

1. An intelligent insect trap comprising:
an internal active adhesive/sticky usable surface (3);
two or more additional adhesive surfaces (3);
a cylindrical or prismatic housing (1) provided with a plurality of perimeter entrances (2) that are spaced apart and are configured to allow access to the internal active adhesive/sticky usable surface (3),
a container (7) holding a semiochemical lure,
one or more cameras (4) oriented toward the active usable surface (3); and
a battery,
a servomotor;
wherein an upper part of the cylindrical or prismatic housing (1) is configured to store the two or more additional adhesive surfaces (3), which are mobile along the housing (1),
wherein the two or more adhesive surfaces (3) are disc or ring-shaped, and are coaxially positioned within the housing (1); and the two or more adhesive surfaces (3) are configured to be positioned consecutively in the active state by actuating the servomotor (12).

2. The intelligent insect trap, according to claim 1, further comprising a housing support (5) holding one or more adjustable photovoltaic plates (6) for battery recharging, wherein the photovoltaic plate is housed on top of the housing (1).

3. The intelligent insect trap, according to claim 1, further comprising a communication system with a computer server.

4. The intelligent insect trap, according to claim 1, wherein the servomotor (12) is provided with an upper claw (14) and a lower claw (13), wherein:
the upper claw (14) is configured to separate an adhesive surface facing the container (7) from the two or more additional adhesive surfaces (3); and
the lower claw (13) is configured to release the separated adhesive surface (3) facing the container (7) from the two or more stacked adhesive surface (3).

5. The intelligent insect trap, according to claim 1, wherein the servomotor (12) is rotatably coupled to a variably pitched worm screw (11) comprising a first pitch and a second pitch, the worm screw (11) including a slot, configured to receive at least a portion of an alignment pin (31) such that the alignment pin (31) engages with the slot to interlock the two or more additional adhesive surfaces (3) with the worm screw (11), wherein:
the first pitch is provided towards an upper portion of the worm screw (11), configured to position the two or more additional adhesive surfaces (3) adjacent to one another; and
the second pitch is provided towards a lower portion of the worm screw (11), configured to maintain an adhesive surface (3) that is facing towards the container (7) spaced apart from the remaining adhesive surfaces (3).

* * * * *